United States Patent [19]
Okita et al.

[11] Patent Number: 5,973,017
[45] Date of Patent: Oct. 26, 1999

[54] FOAMED RUBBER BLEND CONTAINING AND ETHYLENE-PROPYLENE-DIENE POLYMER BLEND AND AN ARTICLE FORMED FROM A SULFUR-VULCANIZED FOAMED RUBBER BLEND

[75] Inventors: Tomoaki Okita; Takashi Mizushima; Katsumi Nakashima, all of Aichi-ken, Japan

[73] Assignee: Toyoda Gosei Co., Ltd., Nishikasugai-gun, Japan

[21] Appl. No.: 08/972,573

[22] Filed: Nov. 18, 1997

[30]       Foreign Application Priority Data

Nov. 20, 1996   [JP]   Japan ................................ 8-309519
Sep. 26, 1997   [JP]   Japan ................................ 9-261549

[51] Int. Cl.$^6$ .............................. C08L 23/16; C08J 9/00
[52] U.S. Cl. ......................... 521/140; 521/82; 521/134; 525/211; 525/232; 525/240
[58] Field of Search ........................... 521/140, 82, 134; 525/211, 232, 240

[56]              References Cited
              U.S. PATENT DOCUMENTS 4,212,787   7/1980   Matsuda et al. ...................... 521/140
4,247,652   1/1981   Matsuda et al. ...................... 521/140

*Primary Examiner*—Morton Foelak
*Attorney, Agent, or Firm*—Pillsbury Madison & Sutro LLP

[57]                ABSTRACT

A foamed rubber blend comprising an EPDM is polymer blend comprising at least one high molecular weight component and at least one low molecular weight component is provided. The high molecular weight component has a weight average molecular weight (Mw) in a range of from about 400,000 to about 800,000 and a molecular weight distribution index (Mw/Mn) in a range of from about 5.5 to about 9.5. The low molecular weight component has a weight average molecular weight (Mw) in a range of from about 150,000 to about 500,000 and a molecular weight distribution index (Mw/Mn) in a range of from about 1.5 to about 5.5. The EPDM rubber has an overall weight average molecular weight (Mw) in a range of from about 200,000 to about 700,000. The ratio of the polymer blend in the foamed rubber blend is in a range of from about 33 wt % to about 60 wt %. The present invention is also directed to an article formed from a sulfur-vulcanized EPDM rubber blend having a compression set according to JIS K 6301 of not more than about 24%.

16 Claims, 2 Drawing Sheets

Door Weatherstripping

Roof side rail Weatherstripping

FOAMED RUBBER BLEND CONTAINING AND ETHYLENE-PROPYLENE-DIENE POLYMER BLEND AND AN ARTICLE FORMED FROM A SULFUR-VULCANIZED FOAMED RUBBER BLEND

BACKGROUND OF THE INVENTION

1. Field of the Invention

The present invention relates to a foamed rubber blend comprising an ethylene-propylene-diene (EPDM) polymer blend including at least one high molecular weight component and at least one low molecular weight component, and in particular to a foamed rubber blend that can be vulcanized as an extrudate via a microwave vulcanization step, or a hot air vulcanization step. The present invention also relates to articles formed by sulfur vulcanization of the foamed rubber blend of the present invention.

2. Description of Related Art

Weather stripping comprising a spongy portion with a high degree of foam content is desirable due to its light weight and low density, since a reduced amount of raw materials can be used per given volume. These advantageous properties can be further enhanced by increasing the degree of foaming of the foamed rubber blend from which the weather stripping is made by increasing the amount of foaming agent in the composition. However, increasing the degree of foaming compromises both the resistance of the weather stripping to fatigue and the rigidity of the weather stripping.

SUMMARY OF THE INVENTION

It is therefore an object of the present invention to overcome the above-mentioned problems and provide a foamed rubber article in which the rigidity and fatigue resistance of the article can be maintained at satisfactory levels while achieving a high degree of foaming.

In accordance with the principles of the present invention, this and other objects can be achieved by providing a foamed rubber blend comprising an EPDM polymer blend comprising at least one high molecular weight component and at least one low molecular weight component. The high molecular weight component has a weight average molecular weight (Mw), $$M_w = \Sigma M_i^2 N_i / \Sigma M_i N_i$$

in a range of from about 400,000 to about 800,000 and a molecular weight distribution index (Mw/Mn), wherein Mn is the number average molecular weight, $$M_n = \Sigma M_i N_i / \Sigma N_i$$

in a range of from about 5.5 to about 9.5. The low molecular weight component has a weight average molecular weight (Mw) in a range of from about 150,000 to about 500,000 and a molecular weight distribution index (Mw/Mn) in a range of from about 1.5 to about 5.5. The concentrations of the components should be selected to provide the polymer blend with a weight average molecular weight (Mw) in a range of from about 200,000 to about 700,000 and a molecular weight distribution index (Mw/Mn) in a range of from about 2.5 to about 7.5. The ratio of the polymer blend in the foamed rubber blend is in a range of from 33% to 60% by weight.

It is also an object of the present invention to provide an article possessing excellent rigidity and resistance to fatigue, even when the article contains a high degree of foaming.

In accordance with the present invention, this and other objects are achieved by providing an article comprising a sulfur-vulcanized EPDM rubber, which is obtained by sulfur-vulcanization of the aforementioned EPDM rubber blend which comprises a vulcanization system. The sulfur-vulcanized EPDM rubber has a compression set (according to JIS K 6301) of not more than 24%.

The principles of the present invention enunciated above are applicable to all types of articles, but have particular applicability to automobile parts, such as weather stripping for automobile doors.

These and other objects, features, and advantages of the present invention will become more apparent from the following detailed description when taken in conjunction with the accompanying drawings which illustrate, by way of example, the principles of the present invention.

BRIEF DESCRIPTION OF THE DRAWINGS

The accompanying drawings illustrate the present invention. In such drawings.

DESCRIPTION OF THE PREFERRED EMBODIMENTS

Figure 1:
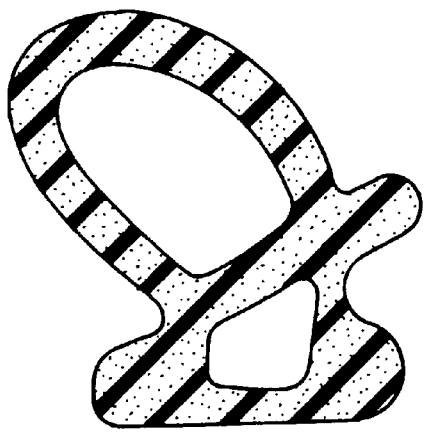
FIG. 1 is a sectional view of a segment of spongy door weather stripping made from the foamed rubber blend of the present invention.
Figure 2:
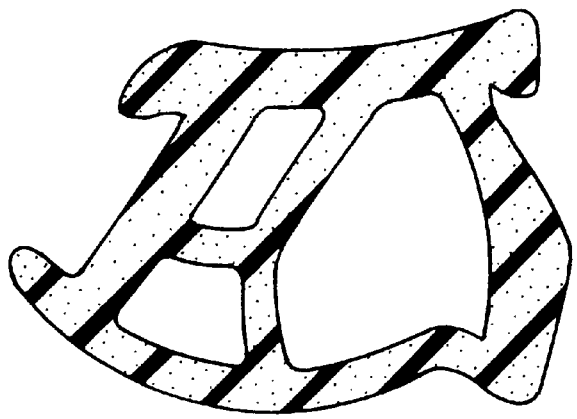
FIG. 2 is a sectional view of a segment of roof side rail weather stripping made from the foamed rubber blend of the present invention.

In the present invention, all amounts are provided in units by weight, unless otherwise specified.

One embodiment of the present invention relates to a foamed rubber blend comprising an EPDM polymer blend having a weight average molecular weight in a range of from about 200,000 to about 700,000, preferably in a range of from about 300,000 to about 600,000. The EPDM polymer blend comprises:

(A) at least one high-molecular weight EPDM component having a weight average molecular weight in a range of from about 400,000 to about 800,000, preferably in a range of from about 500,000 to about 700,000, and a molecular weight distribution index (Mw/Mn) in a range of from about 5.5 to about 9.5, preferably in a range of from about 6.5 to about 8.5; and (B) at least one low molecular weight EPDM component having a weight average molecular weight in a range of from about 150,000 to about 500,000, preferably in a range of from about 200,000 to about 400,000, molecular weight distribution index (Mw/Mn) in a range of from about 1.5 to about 5.5, preferably in a range of from about 2.0 to about 4.5.

Examples of the diene component of the EPDM include, by way of example and without limitation, ethylidenenorbornene, and dicyclopentadiene.

Selecting high and low molecular weight EPDM components satisfying the above-specified molecular weight and molecular weight distribution properties prevents the loss of rigidity and fatigue resistance when the blend is subjected to high foaming, e.g., by the introduction of a relatively large concentration of foaming agent into the blend.

Applications requiring a high degree of rigidity, such a weather stripping for a roof side rail, generally command the incorporation of a high molecular weight EPDM component having a high degree of polymerization, and thus a high molecular weight. Conversely, applications requiring a low degree of rigidity, such as weather stripping for a door, generally involve the use of a low molecular weight EPDM component with a low degree of polymerization, and, therefore, a low molecular weight. Although the present invention is not limited to the following theory, this phenomena is thought to be attributable to the formation of a skin by the high molecular weight component prior to the initiation of foaming, which suppresses degassing during foaming.

The ratio of the EPDM polymers in the foamed rubber blend is preferably about 33 wt. % to about 60 wt. %, more preferably about 35 wt. % to about 45 wt. %. When a high degree of rigidity is required or desired, such as in the case of making roof side rail weather stripping, the polymer ratio is relatively high. Conversely, when low rigidity is required or desired, such as in the case of making a door weather stripping, the polymer is set at a relatively low ratio. For example, as presented in Table 1, the ratio for making a roof side rail weather stripping is preferably about 37 wt. % to about 40 wt. %. The ratio can be slightly lower for making a door weather stripping, preferably about 35 wt. % to about 39 wt. %.

Exceeding a polymer ratio of about 60 wt. % decreases the extrusion moldability of the blend, resulting in surface roughness.

The propylene concentration of the EPDM polymers, or $C_3$ content, for the high molecular weight component and the low molecular component can be between about 30 wt. % and about 45 wt. %, preferably between about 32 wt. % and 40 wt. %. The iodine value, the measurement of which is within the purview of those skilled in the art without undue experimentation, is between about 20 wt. % and 35 wt. %, preferably about 28 wt. % to about 32 wt. %, as determined from the percentage by weight of iodine absorbed by the sample.

The article of the present invention can be formed by sulfur-vulcanization of the above-described EPDM polymer blend with a sulfur vulcanization system. The compression set of the resulting sulfur-vulcanized rubber according to JIS K 6301 is not more than about 24%. Compression set values exceeding about 24% are undesirable for compositions such as the present invention, which are intended for use as, for example, sealing members, such as weather stripping. Generally, polymer ratios greater than 35 wt. % create products with low compression set values.

The sulfur vulcanization system of the present invention comprises a vulcanization accelerator, which is preferably a five-component composition comprising a dithiocarbamate, thiazole, thiourea, morpholine, and a thiuram. The dithiocarbamate may be, for example, zinc dibutyl dithiocarbamate, zinc dimethyl dithiocarbamate, or tellurium diethyl dithiocarbamate. The vulcanization accelerator of this composition imparts stability to the foamed rubber blend during storage.

Conventional foamed rubber blends employ sulfur vulcanization agents comprising a four-component vulcanization accelerator, comprising a dithiocarbamate, thiazole, thiourea and morpholine. (This conventional four-component vulcanization accelerator was employed in the Conventional Examples.) In accordance with the present invention, the conventional four-component vulcanization accelerator is modified by the addition of a thiuram vulcanization accelerator in a concentration of about 0.5 phr to about 3.0 phr (parts by weight per hundred parts of rubber), preferably from about 1.0 phr to about 2.5 phr. Compositions deficient in concentration of the thiuram member lack the effect normally afforded by this member, namely good fatigue resistance, as measured, for example, by a low compression set value in the article ultimately comprising the vulcanized composition.

Examples of thiruam vulcanization accelerators include, by way of example and without limitation, tetrakis(2-ethylhexyl)thiuram disulfide, tetramethylthiuram disulfide, and tetraethylthiuram disulfide.

The concentrations of sulfur and other vulcanization accelerators are usually as follows:

sulfur from about 0.5 phr to about 2.5 phr, preferably 1.0 phr to about 2.0 phr;

a dithiocarbamate member from about 0.7 phr to about 2.5 phr, preferably about 0.7 phr to about 2.0 phr;

thiazole from about 1.0 phr to about 2.0 phr, preferably about 1.5 phr to about 2.0 phr;

thiourea from about 0.75 phr to about 3.0 phr, preferably about 1.0 phr to about 3.0 phr;

morpholine from about 0.1 phr to about 0.5 phr; and a thiuram member from about 0.5 phr to about 3.0 phr, preferably 1.0 phr to about 2.5 phr.

The vulcanization system also contains a foaming agent, which preferably has an initial decomposition temperature of not less than about 158° C. Examples of such foaming agents include p,p'-oxybisbenzenesulfonyl hydrazide, which has an initial decomposition temperature of about 160° C. Although not precluded by the present invention, foaming agents with initial decomposition temperatures of less than about 158° C. are problematic, since they initiate foaming prior to the formation of the polymer skin layer. This leads to a product with a low foam specific gravity, characterized by a rough surface.

The sulfur vulcanization system of the present invention may also contain additives in addition to the vulcanizing agent. Additives may include, for example and without limitation, carbon black, processing oil, zinc oxide, stearic acid, an antioxidant, and an inorganic filler, and any combination thereof.

Preferably, the carbon black is a high structure, possessing an oil absorption capacity, as per JIS K 6221A, of from about 100 cc/100 g to about 200 cc/100 g. Incorporation of high structure carbon black into a rubber blend imparts substantial mechanical strength to the vulcanized rubber end product. The amount of carbon black in the blend can be from about 60 phr to about 110 phr, and preferably is from about 75 phr to about 90 phr. Insufficient levels of carbon black in the composition may prevent the foamed rubber blend from achieving proper rigidity, whereas too much carbon black may inhibit high level foaming.

The foamed rubber material of the present invention is synthesized by blending the EPDM components of the prescribed molecular weights and molecular weight distribution indices, the above-described sulfur vulcanization system, and additives, as required or desired for the intended use of the foamed rubber blend. The article of the present invention, such as a sponge portion of a weather stripping, is produced by injection molding of the foamed rubber of the invention, followed by microwave vulcanization (UHF vulcanization) and/or hot air vulcanization (HAV).

The foamed rubber blend of the present invention comprises an EPDM polymer blend comprising at least one EPDM high molecular weight polymer component and at least one EPDM low molecular weight polymer component, the ratio of the EPDM polymer blend based on the total weight of the foamed rubber blend being in a range of from about 33 wt. % to about 60 wt. %, and the compression set value (according to JIS K 6301) of the sulfur-vulcanized EPDM rubber being not more than 24%.

The properties of the vulcanized rubber are shown in the Examples, such as good rigidity and fatigue resistance in the presence of high level foaming. The vulcanized rubber from the foamed rubber blend of the invention exhibits properties that, when plotted as foam specific gravity on the abscissa (X-axis) versus low elongation stress in kPa on the ordinate (Y-axis) of a Cartesian plane, lie to the left of line A in FIG. 3 defined by the x,y coordinates (0.52, 180) and (0.64, 330 kPa), wherein a 25% low elongation stress (according to JIS K 6301) of 180 kPa or more is measured. The 25% low elongation stress value of 180 kPa delineates the lower limit of rigidity acceptable for a door weather stripping. Line A represents the best fit line for the Comparative Examples, meaning items situated to the right of Line A do not possess the proper values for exhibiting good rigidity and foaming properties.

These desired characteristics can be obtained when utilizing the above-described five-component vulcanization accelerator in the sulfur vulcanization system, and a foaming agent with an initial decomposition temperature of at least 158° C. The properties of the foamed rubber blend upon vulcanization are situated to the left of a line B in FIG. 3 defined by the coordinates (0.45, 180) and (0.55, 290) in a Cartesian plane, wherein the foam specific gravity is plotted on the abscissa (X-axis) and low elongation stress in kPa units is plotted on the ordinate (Y-axis), with a 25% low elongation stress (according to JIS K 6301) of $\geq 180$ kPa. Line B represents the coordinate boundaries for vulcanized foam rubber blends, showing foaming and rigidity properties acceptable for use in roof side rail and door weather stripping.

Figure 3:
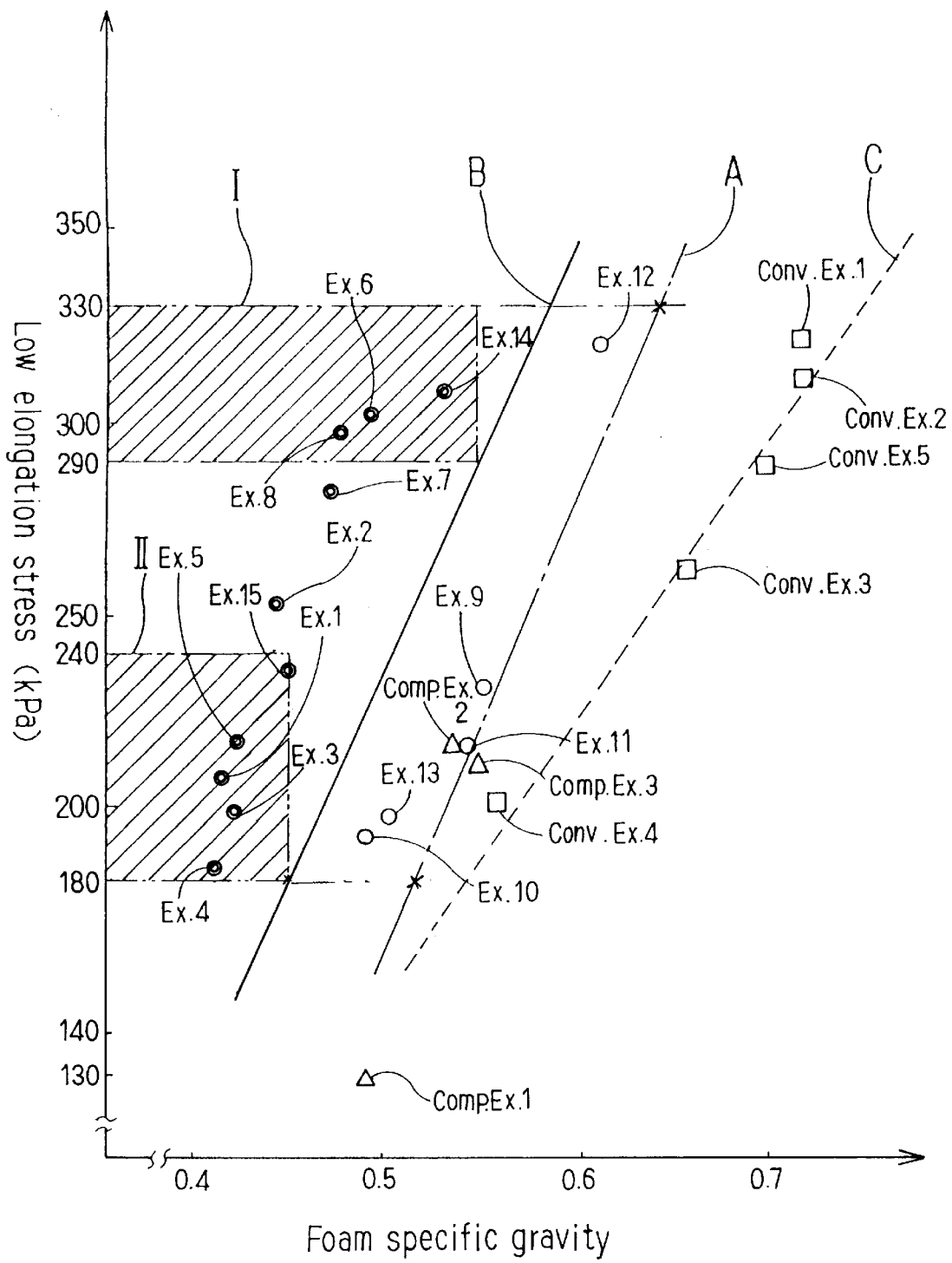
FIG. 3 is a graph depicting the results from the Conventional Examples, Comparative Examples, and Examples, plotting the foam specific gravity values on the abscissa (X axis) versus the low elongation stress values on the ordinate (Y axis), for the various foamed rubber blends tested.

The hatched regions I and II of FIG. 3 depict the amounts of rigidity (foam specific gravity vs. low elongation stress) expected for roof side rail and door weather strippings made from the present invention, as described in the Examples. In hatched region I, foam specific gravity is $\leq 0.55$, while low elongation stress ranges from 290 to 330 kPa. Hatched region II encompasses a section wherein foam specific gravity is $\leq 0.45$ and low elongation stress ranges from 180 to 240 kPa.

Line C in FIG. 3 graphs the relationship of foam specific gravity versus low elongation stress for the Conventional Examples.

EXAMPLES

The present invention is illustrated in the drawings.

(1) Production of Test Pieces

A blend comprising a set of the reagents shown in Tables 1–4 was kneaded in preparation for extrusion molding. The material was placed in an extrusion-molding machine, and processed into an extrudate with the sectional shape shown in FIG. 1. This extrudate was vulcanized with UHF vulcanization at an output of 5 kW for 30 sec, and with HAV at 220° C. for 3 min, yielding a foamed extrudate.

The EPDM polymer used in this process had the following characteristics for each polymer type.

The conventional polymer B was a single component polymer with a Mw of 500,000, a Mw/Mn of 5.0, and a polyethylene content of 60%.

The novel polymer A was formed from a polymer blend including, as the low molecular weight polymer, a polymer having a Mw of 320,000, a Mw/Mn of 2.8, and an ethylene content of 54%, and as the high molecular weight polymer, a polymer having a Mw of 610,000, a Mw/Mn of 7.4, and an ethylene content of 60%. The low molecular weight polymer/high molecular weight polymer ratio was 60:40.

(2) Test Items

The foam specific gravity was measured by the method of substitution in water, according to JIS K 6301. A 25% low elongation stress, measured in kPa, of a test piece (No.1, 5 mm) was measured at room temperature according to JIS K 6301. A compression set percentage was measured at 70° C. after 200 hours according to JIS K 6301. The storage stability of each rubber blend was determined by measuring the Mooney viscosity of each blend immediately after kneading, compared to the viscosity after storage for 3 days at 40° C. The net change was designated as the index of stability.

The test results are presented in Tables 1–4, and in FIG. 3. The results show that the Examples, which fall within the scope of the present invention, possess the desirable qualities of high foaming levels, high rigidity, excellent storage stability, low compression set, and outstanding fatigue resistance. The Conventional Examples and Comparative Examples, which lie outside the scope of the invention, exhibited results that do not meet the same criteria. For example, Comparative Example 2 is positioned to the left of line A in FIG. 3, but it has poor fatigue resistance.

The following materials were employed in the Examples, Comparative Examples and Conventional Examples.

Carbon was obtained from Asahi Carbon Co., Ltd., catalogue number 50HGS.

The process oil was DIANOPROCESSOIL™ PW-380, a paraffin from Idemitsu Kosan Co., Ltd.

The zinc oxide was AZO-B™ from Seido Kagaku Co., Ltd.

The dehydrating agent was CML™ 31, a CaO from Ohmi Kagaku Co. Ltd.

The processing aids were 1.0 phr LUNAC™ S-30T stearic acid from KAO Corporation and 2.5 phr STRUCK-TOL™ WB212 wax from Colombian Carbon Nippon Co., Ltd.

The dithiocarbamate (1) was zinc di-n-butyl dithiocarbamate mercaptobenzothiazole (NOCCELER™ BZ), obtained from Ouchi-Shinko C.I. Co. Ltd.

The thiazole (2) was cyclohexylamine salt of 2-mercaptobenzothiazole (NOCCELER™ M200), obtained from Ouchi-Shinko C.I. Co. Ltd.

The thiuram (3) was tetrakis (2-ethylhexyl) thiuramdisulfide (NOCCELER™ TOT-N), obtained from Ouchi-Shinko, C.I., Co. Ltd.

The thiourea (4) was 2-mercapto-imidazoleline (VULKACIT™ NPV/C), obtained from Bayer Co. Ltd.

The morpholine (5) was 4,4'-dithiomorpholine (VULCANOC™ R), obtained from Ouchi-Shinko, C.I. Ltd.

TABLE 1

|  | Example 1 | Example 2 | Example 3 | Example 4 | Example 5 | Example 6 |
| --- | --- | --- | --- | --- | --- | --- |
| polymer A | 100 | 100 | 100 | 100 | 100 | 100 |
| carbon | 90 | 75 | 90 | 90 | 90 | 90 |

TABLE 1-continued

|  | Example 1 | Example 2 | Example 3 | Example 4 | Example 5 | Example 6 |
|---|---|---|---|---|---|---|
| process oil | 65 | 55 | 65 | 65 | 65 | 40 |
| zinc oxide | 7 | 7 | 7 | 7 | 7 | 7 |
| dehydrating agent | 5 | 5 | 5 | 5 | 5 | 5 |
| process aid | 3.5 | 35 | 3.5 | 3.5 | 3.5 | 3.5 |
| sulfur | 1.5 | 1.5 | 1.0 | 2.0 | 1.5 | 1.5 |
| (1) dithiocarbamate | 1.5 | 1.5 | 0.7 | 2.5 | 1.5 | 1.5 |
| (2) thiazole | 1.7 | 1.7 | 1.0 | 2.0 | 1.7 | 1.7 |
| (3) tbiuram | 1.25 | 1.25 | 0.5 | 2.5 | 1.25 | 2.25 |
| (4) thiourea | 2.0 | 2.0 | 1.0 | 3.0 | 2.0 | 1.0 |
| (5) morpholine | 0.3 | 0.3 | 0.1 | 0.5 | 0.3 | 0.3 |
| foaming agent A (decomposition temperature 160° C.) | 4.5 | 4.5 | 4.5 | 4.5 | 3.5 | 4.0 |
| Total amount | 283.25 | 258.25 | 279.3 | 287.5 | 282.25 | 267.75 |
| Ratio of a polymer (%) | 35.3 | 38.8 | 36.7 | 36.3 | 36.3 | 39.2 |
| Foam specific gravity | 0.415 | 0.448 | 0.421 | 0.413 | 0.423 | 0.498 |
| Low elongation stress (kPa) | 207 | 253 | 199 | 183 | 218 | 302 |
| Compression set (%) | 18 | 19 | 19 | 20 | 16 | 15 |
| Storage stability | +3 | +3 | +2 | +3 | +2 | +2 |

TABLE 2

|  | Example 7 | Example 8 | Comparative Example 1 | Comparative Example 2 | Example 9 | Example 10 |
|---|---|---|---|---|---|---|
| polymer A | 100 | 100 | 100 | 100 | 100 | 100 |
| carbon | 90 | 90 | 105 | 105 | 90 | 90 |
| process oil | 50 | 40 | 75 | 75 | 85 | 85 |
| zinc oxide | 7 | 7 | 7 | 7 | 7 | 7 |
| dehydrating agent | 5 | 5 | 5 | 5 | 5 | 5 |
| process aid | 3.5 | 3.5 | 3.5 | 3.5 | 3.5 | 3.5 |
| sulfur | 1.5 | 2.0 | 1.5 | 1.5 | 1.5 | 1.5 |
| (1) dithiocarbamate | 1.5 | 2.5 | 1.5 | 1.5 | 1.5 | 1.5 |
| (2) thiazole | 1.7 | 2.0 | 1.7 | — | 1.7 | 1.7 |
| (3) thiuram | 2.25 | 2.5 | 1.25 | 1.0 | 0.9 | 2.25 |
| (4) thiourea | 1.0 | 3.0 | 2.0 | 0.75 | 2.0 | 2.0 |
| (5) morpholine | 0.3 | 0.5 | 0.3 | 0.3 | 0.3 | 0.3 |
| foaming agent A (decomposition temperature 160° C.) | 4.5 | 4.5 | 4.5 | — | 4.5 | 4.5 |
| foaming agent B (decomposition temperature 154° C.) | — | — | — | 4.5 | — | — |
| Total amount | 268.25 | 262.5 | 307.3 | 305.1 | 283.3 | 282.0 |
| Ratio of a polymer (%) | 37.3 | 38.1 | 32.5 | 32.8 | 35.3 | 35.5 |
| Foam specific gravity | 0.476 | 0.483 | 0.495 | 0.521 | 0.543 | 0.494 |
| Low elongation stress (kpa) | 281 | 297 | 130 | 221 | 231 | 187 |
| Compression set (%) | 17 | 16 | 21 | 25 | 15 | 22 |
| Storage stability | +2 | +3 | +3 | +15 | +4 | +8 |

TABLE 3

|  | Example 11 | Example 12 | Comparative Example 3 | Example 13 | Example 14 | Example 15 |
|---|---|---|---|---|---|---|
| polymer A | 100 | 100 | 100 | 100 | 100 | 100 |
| carbon | 90 | 90 | 90 | 90 | 95 | 90 |
| process oil | 65 | 60 | 65 | 65 | 57 | 65 |
| zinc oxide | 7 | 7 | 7 | 7 | 7 | 7 |
| dehydrating agent | 5 | 5 | 5 | 5 | 5 | 5 |
| process aid | 3.5 | 3.5 | 3.5 | 3.5 | 3.3 | 3.3 |
| sulfur | 1.5 | 1.5 | 1.5 | 1.5 | 1.5 | 1.5 |
| (1) dithiocarbamate | 1.5 | 1.5 | 0.7 | 2.5 | 1.5 | 1.5 |
| (2) thiazole | 1.7 | 1.7 | 1.0 | 2.0 | 1.7 | 1.7 |
| (3) tbiuram | 1.25 | 2.75 | 0.3 | 2.7 | 1.25 | 1.25 |
| (4) thiourea | 2.0 | 1.0 | 1.0 | 3.0 | 1.5 | 2.0 |
| (5) morpholine | 0.3 | 0.3 | 0.1 | 0.5 | 0.3 | 0.3 |
| foaming agent A (decomposition temperature 160° C.) | — | 4.5 | 4.5 | 4.5 | 4.5 | 4.5 |
| foaming agent B (decomposition temperature 154° C.) | 4.5 | — | — | — | — | — |
| Total amount | 281.0 | 293.8 | 294.6 | 302.2 | 279.6 | 283.1 |
| Ratio of a polymer (%) | 35.6 | 34.1 | 33.9 | 33.1 | 35.8 | 35.3 |
| Foam specific gravity | 0.523 | 0.593 | 0.563 | 0.506 | 0.530 | 0.450 |
| Low elongation stress (kpa) | 219 | 326 | 216 | 193 | 307 | 236 |
| Compression set (%) | 18 | 19 | 27 | 23 | 21 | 23 |
| Storage stability | +2 | +2 | +4 | +10 | +3 | +3 |

TABLE 4

|  | Conventional Example 1 | Conventional Example 2 | Conventional Example 3 | Conventional Example 4 | Conventional Example 5 |
|---|---|---|---|---|---|
| polymer B* | 120 | 120 | 120 | 120 | 120 |
| carbon | 120 | 120 | 120 | 120 | 120 |
| process oil | 65 | 65 | 80 | 90 | 70 |
| filler | 10 | 10 | 10 | 10 | 10 |
| zinc oxide | 7 | 7 | 7 | 7 | 7 |
| dehydrating agent | 5 | 5 | 5 | 5 | 5 |
| vulcanization aid | 3.5 | 3.5 | 3.5 | 3.5 | 3.5 |
| sulfur | 1.3 | 1.3 | 1.3 | 1.3 | 1.3 |
| (1) dithiocarbamate | 1.5 | 1.5 | 1.5 | 1.5 | 1.5 |
| (2) thiazole | 2.5 | 2.5 | 2.5 | 2.5 | 2.5 |
| (3) tbiourea | 2.0 | 2.0 | 2.0 | 2.0 | 2.0 |
| (4) morpholine | 0.3 | 0.3 | 0.3 | 0.3 | 0.3 |
| foaming agent B (decomposition temperature 154° C.) | 3.0 | 3.5 | 4.0 | 4.0 | 4.0 |
| Total amount | 343.1 | 343.6 | 359.1 | 389.1 | 348.1 |
| Ratio of a polymer (%) | 29.1 | 29.1 | 27.8 | 27.1 | 28.7 |
| Foam specific gravity | 0.721 | 0.723 | 0.656 | 0.554 | 0.702 |
| Low elongation stress (kpa) | 319 | 310 | 262 | 198 | 289 |
| Compression set (%) | 22 | 23 | 26 | 29 | 26 |
| Storage stability | +10 | +9 | +11 | +12 | +9 |

*containing 20 parts of an oil

A foamed rubber blend and an article obtained by subjecting the same to sulfur vulcanization are disclosed in application No. 8-309519, filed in Japan on Nov. 20, 1996, and in application No. 9-261549, filed in Japan on Sep. 26, 1997, the complete disclosures of which are incorporated herein by reference.

The foregoing detailed description of the preferred embodiments of the invention has been provided for the purposes of illustration and description. It is not intended to be exhaustive or to limit the invention to the precise embodiments disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A foamed rubber blend comprising an EPDM polymer blend comprising:
    (A) at least one high molecular weight EPDM component having a weight average molecular weight in a range of from about 400,000 to about 800,000 and a molecular weight distribution index in a range of from about 5.5 to about 9.5; and
    (B) at least one low molecular weight EPDM component having a weight average molecular weight in a range of from about 150,000 to about 500,000 and a molecular weight distribution index in a range of from about 1.5 to about 5.5,
    wherein the polymer blend has a weight average molecular weight in a range of from about 200,000 to about 700,000,
    wherein a ratio of the polymer blend in the foamed rubber blend is in a range of from about 33 wt % to about 60 wt %.

2. The foamed rubber blend according to claim 1, wherein:
    the weight average molecular weight of the polymer blend is in a range of from about 300,000 to about 600,000;
    the weight average molecular weight of the high molecular weight EPDM component is in a range of from about 500,000 to about 700,000;
    the molecular weight distribution index of the high molecular weight EPDM component is in a range of from about 6.5 to about 8.5;
    the weight average molecular weight of the low molecular weight EPDM component is in a range of from about 200,000 to about 400,000; and
    the molecular weight distribution index of the low molecular weight EPDM component is in a range of from about 2.0 to about 4.5.

3. The foamed rubber blend according to claim 1, wherein the ratio of the polymer blend in the foamed rubber blend is in a range of from about 35 wt. % to about 45 wt. %.

4. The foamed rubber blend according to claim 1, further comprising a vulcanization system comprising a vulcanization accelerator, wherein the vulcanization accelerator comprises a dithiocarbamate, thiazole, thiourea, morpholine, and a thiuram.

5. The foamed rubber blend according to claim 4, wherein the vulcanization system comprises:
    0.5 to 2.5 parts of sulfur;
    0.7 to 2.5 parts of the dithiocarbamate;
    1.0 to 2.0 parts of thiazole;
    0.75 to 3.0 parts of thiourea;
    0.1 to 0.5 parts of morpholine; and
    0.5 to 3.0 parts of the thiuram.

6. The foamed rubber blend according to claim 5, wherein the vulcanization system comprises:
    1.0 to 2.0 parts of sulfur;
    0.7 to 2.0 parts of the dithiocarbamate;
    1.5 to 2.0 parts of thiazole;
    0.75 to 3.0 parts of thiourea;
    0.1 to 0.5 parts of morpholine; and
    1.0 to 2.5 parts of the thiuram.

7. The foamed rubber blend according to claim 5, wherein the vulcanization system further comprising a foaming agent having an initial decomposition temperature of not less than about 158° C.

8. The foamed rubber blend according to claim 7, wherein the foaming agent is p,p'-oxybisbenzenesulfonyl hydrazide.

9. The foamed rubber blend according to claim 7, wherein the vulcanization system further comprises carbon black in an amount of from about 75 to about 90 phr, and wherein the carbon black is a high structure, with a measured oil absorption amount (according to JIS K 6221 A) of from about 100 cc/100 g to about 120 cc/100 g.

10. An article comprising a sulfur-vulcanized foamed rubber blend, the foamed rubber blend comprising:
    (A) at least one high molecular weight EPDM component having a weight average molecular weight in a range of from about 400,000 to about 800,000 and a molecular weight distribution index in a range of from about 5.5 to about 9.5; and
    (B) at least one low molecular weight EPDM component having a weight average molecular weight in a range of from about 150,000 to about 500,000 and a molecular weight distribution index in a range of from about 1.5 to about 5.5,
    wherein the polymer blend has a weight average molecular weight in a range of from about 200,000 to about 700,000,
    wherein a ratio of the polymer blend in the foamed rubber blend is in a range of from about 33 wt % to about 60 wt %, and
    wherein the sulfur-vulcanized EPDM rubber has a compression set (according to JIS K 6301) of not more than about 24%.

11. The article according to claim 10, wherein the properties of the sulfur-vulcanized foamed rubber blend lie to the left of a straight line drawn between two points in a Cartesian plane with the respective (x,y) coordinates of (0.52,180) and (0.64, 330), wherein the foam specific gravity values are plotted on the abscissa and the elongation stress values in kPa units are plotted on the ordinate, with a 25% low elongation stress (according to JIS K 6301) of $\geq 180$ kPa.

12. The article according to claim 10, wherein the properties of the sulfur-vulcanized rubber blend may be represented as points located to the left of a line drawn between two points in a Cartesian plane with the respective (x,y) coordinates of (0.45,180) and (0.55,290), wherein the foam specific gravity values are plotted on the abscissa and the elongation stress values in kPa units are plotted on the ordinate.

13. The article according to claim 12, wherein the sulfur-vulcanized EPDM rubber has a foam specific gravity of not more than 0.55, and a low elongation stress value of from about 290 to about 330 kPa.

14. The article according to claim 13, wherein the forms at least a portion of a roof side rail weather stripping.

15. The article according to claim 12, wherein the sulfur-vulcanized EPDM rubber has a foam specific gravity of not more than 0.45 and has a low elongation stress value of from about 180 to about 240 kPa.

16. The article according to claim 15, wherein the article forms at least a portion of a door weather stripping.

* * * * *